June 13, 1950  D. F. STRANBERG  2,511,134
SLEEVE TYPE TUBE COUPLING
Filed May 27, 1946
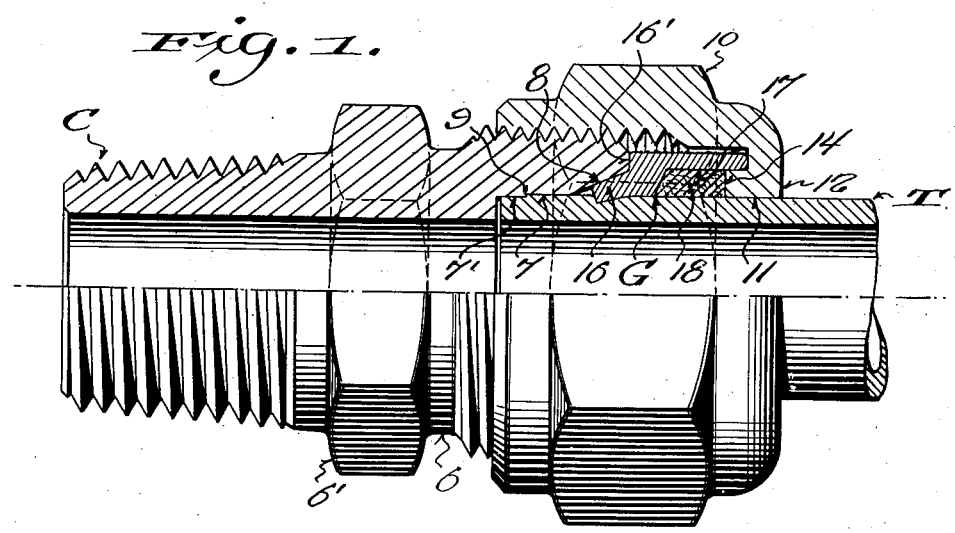
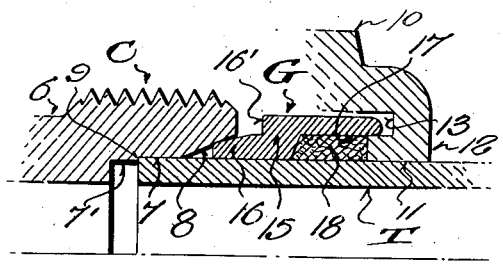
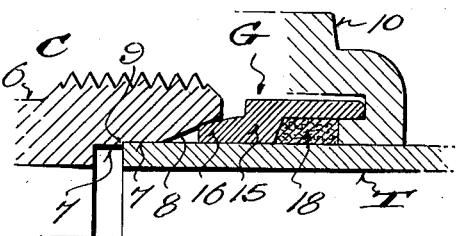
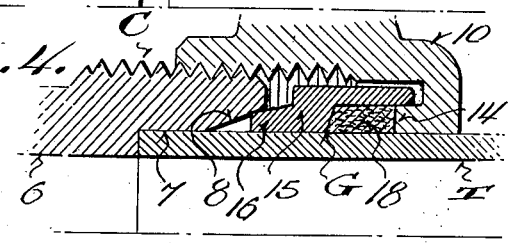
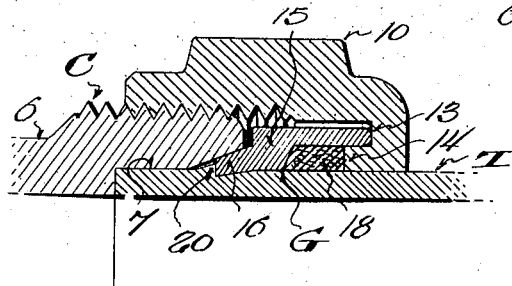
Inventor
Don F. Stranberg
By
Attorney Patented June 13, 1950

2,511,134

UNITED STATES PATENT OFFICE 2,511,134

SLEEVE TYPE TUBE COUPLING

Don F. Stranberg, Libertyville, Ill., assignor to Anchor Coupling Company, Inc., Libertyville, Ill.

Application May 27, 1946, Serial No. 672,590

8 Claims. (Cl. 285—122)

This invention pertains to tube couplings, and more particularly to novel means for attachment of a coupling to the end of a metallic tube.

The invention has primarily for its object to provide a comparatively simple and inexpensive coupling, having a composite clamping member to form a positive grip and pressure seal between the coupling and a metallic tube, and also absorb vibration transmitted to the tube.

Incidental to the foregoing, a more specific object of the invention resides in the provision of a contractable sleeve for positively gripping the outer peripheral surface of a tube to form a pressure seal between the tube and coupling, said sleeve being provided with an inner packing ring compressed longitudinally within the sleeve to radially expand its cross-sectional area, causing it to be imbedded into the pores of the sleeve and tube, and serve as an effective cushion for dampening or absorbing vibrations imparted to the tube.

A still further object of the invention is to provide a tube coupling with a composite clamping member consisting of a sleeve having a deformable end for depression into the outer peripheral surface of the tube, and provided at its opposite end with a recess for receiving a ductile packing ring compressible longitudinally within the recess by a swivel nut threaded on the coupling and serving to force the sleeve into a flared mouth of the coupling to contract the deformable end on the tube.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Fig. 1 is a half sectional and half elevational view of a coupling incorporating one form of the present invention;

Fig. 2 is a fragmentary sectional view illustrating the manner of initially assembling the coupling parts on the tube;

Fig. 3 is a similar view showing compression of the ductile packing ring; and

Figs. 4 and 5 are similar views of a modified form of the invention before and after attachment, respectively.

With particular reference to the accompanying drawing C designates generally a coupling attached to the end of a metallic tube T.

The coupling C consists of a body member 6 exteriorly threaded at its opposite ends, and provided with a recess 7 adjacent one of its ends and terminating in a flared or tapered mouth 8. The inner end of the recess 7 is provided with a slightly reduced bore 7' forming an annular shoulder 9 within the recess, against which the end of the tube T abuts in the initial assembly of the coupling on the tube, as best shown in Figs. 2 and 3.

Threaded upon the recessed end of the coupling C is a swivel nut 10 provided with a central opening 11 formed in its end wall 12 for reception of the tube T. An annular groove 13 formed in the end wall 12 creates an inwardly projecting flange 14 on the end wall for the purpose later explained in detail.

Interposed between the recessed end of the coupling C and the end wall 12 of the nut 10 is a composite clamping member G, comprising a sleeve 15 having a reduced deformable end 16 forming a shoulder 16', and provided with an annular recess 17 at its opposite end for reception of a packing ring 18, both the sleeve 15 and the packing ring 18 being initially loosely fitted on the tube T.

While the packing ring 18 may be formed of a number of compressible materials, it is preferred to utilize a metallic ductile material, which has a tendency to flow into the pores of the sleeve 15 and the tube T, to provide an intimate contact and enhance the sealing and gripping effect of the coupling, as well as insuring maximum dampening or absorption of vibration stresses. This is particularly desirable in high pressure couplings.

In low pressure couplings, hard metallic or synthetic rubber, or suitable plastic materials may be employed with satisfactory results, in that the coupling is not subjected to severe strains as in high pressure tubing.

The operation of attaching the coupling C on the tube T is comparatively simple, and requires no special tools or mechanical operations in preparing the tube for the coupling. As best shown in Fig. 2, the nut 10 and composite clamping member G are first slipped over the end of the tube T, which is then inserted into the recess 7 of the coupling body 6, until the tube abuts the shoulder 9. The nut 10 is then turned up on the threads of the body member 6, causing the flange 14 to engage the ductile packing ring 18 and thereafter force the deformable end 16 of the sleeve 15 into contact with the flared mouth 8 of the body member 6. The foregoing manual operation is easily and quickly accomplished without the aid of tools because of the loose fit of the composite clamping member G on the tube.

After the foregoing relation of the parts is accomplished, the hexagon head 6' of the body member may be held with a wrench or vise, and the nut 10 is then further turned upon the threads of the body member by means of a wrench, during which action the sleeve 15 and the tube T are held against relative longitudinal movement by abutment with the flared mouth 8 and the shoulder 9 respectively, of the body member, thus causing the ductile packing ring 18 to be compressed within the recess 17 of the sleeve 15, until the recessed end of the sleeve is engaged by the inner wall of the groove 13 (Fig. 2).

It will be obvious that during the longitudinal compression of the ductile packing ring 18, its cross-sectional area is expanded to force the ductile material into the pores or interstices of the wall of the recess 17 and the outer surface of the tube T, thus firmly locking the sleeve 15 against longitudinal movement on the tube.

Further rotation of the nut 10, after engaging the recessed end of the sleeve 15, forces the deformable end 16 into the flared mouth 8, causing the end to be contracted and imbedded into the outer surface of the tube to form a positive grip between the sleeve and tube, as best shown in Fig. 1.

During the foregoing operation it will be apparent that locking of the sleeve 15 on the tube T, through both compression of the ductile ring 18 and initial contraction of the end 16, prevents relative longitudinal movement between the sleeve and tube. Consequently, as the sleeve 15 is forced further into the flared mouth 8 to complete contraction of the end 16 on the tube, the tube is carried forward with the clamping member G, forcing its end into the restricted bore 7' to create a press fit between the tube and body member, which further insures a pressure seal between the tube and coupling.

It will be apparent that upon engagement of the shoulder 16' with the end of the coupling body 6, the sleeve 15 serves as a positive stop to prevent further travel of the nut 10 on the body member, thus limiting the extent of contraction of the deformable end 16, and prevent undue deformation of the tube.

Referring to the modified form of the invention illustrated in Figs. 4 and 5, it will be noted that the restricted bore 7' and shoulder 9 in the body member 6 has been eliminated. Consequently, in attaching this form of coupling, the end of the tube T is abutted against the inner end of the recess 7 after the nut 10 and gripping member G are assembled upon the tube, in the manner shown in Fig. 4. In this instance, when the nut 10 is threaded on the end of the body member 6, and the deformable end of the sleeve 15 is forced into the flared mouth 8, the sleeve 15 is free to move longitudinally on the tube, which is held by the inner end of the recess 7, thus causing the deformable end 16 to cut into the peripheral surface of the tube and displace an annular flange 20.

During initial travel of the nut 10 on the body member 6, it will be appreciated that resistance of the flared mouth 8 of the body member to the deformable end 16, is sufficient to prevent longitudinal movement of the sleeve 15 on the tube T until such time as compression of the ductile packing ring 18 occurs, and the recessed end of the sleeve is positively engaged by the inner face of the groove 13, after which the entire composite gripping member G is forced forwardly on the tube until the desired extent of contraction of the deformable end 16 is attained.

From the foregoing explanation, considered in connection with the accompanying drawing, it will be obvious that an exceedingly simple and inexpensive sleeve type tube coupling has been provided, which affords a positive grip and pressure tight joint between the coupling and metallic tube, in addition to dampening or absorbing vibration imparted to the tube, which frequently causes failure of tubes at the point of attachment to the coupling.

It will also be realized that the coupling can be quickly and easily attached without the aid of special tools, or preparing the end of the tube. Furthermore, irregularities in the tube are compensated for by the ductile ring that also serves as a vibration dampener. Also reuse of the coupling is made possible by merely cutting off the fractured end of the tube to remove the coupling, and replacing the composite clamping member G.

I claim:

1. In a tube coupling of the character described, a composite clamping member comprising a sleeve having a deformable end and recessed at its opposite end within a non-deformable portion of the sleeve, and a longitudinally compressible and radially expandable packing ring fitted in said recess.

2. A tube coupling comprising, a body member recessed at one end for receiving the end of a tube, said recess having a tapered mouth, a nut threaded on the recessed end of said coupling, and a composite clamping member interposed between said nut and the recessed end of said body member, said clamping member consisting of a sleeve having a deformable end contracted on the tube within said flared mouth and an internal annular recess formed in its non-deformable end, and a packing ring longitudinally compressed within said recess by said nut to radially expand said ring to provide a seal and create a cushion between the sleeve and tube to absorb vibration imparted to the tube.

3. A tube coupling comprising, a body member recessed at one end for receiving the end of a tube, said recess having a tapered mouth, a nut threaded on the recessed end of said coupling, and a composite clamping member interposed between said nut and the recessed end of said body member, said clamping member consisting of a sleeve having a deformable end contracted on the tube within said flared mouth and an internal annular recess formed in its opposite non-deformable end, and a ductile packing ring longitudinally compressed within said sleeve by said nut to radially expand said ring to provide a seal and create a cushion between the sleeve and tube to absorb vibration imparted to the tube.

4. A tube coupling comprising, a body member recessed at one end for receiving the end of a tube, said recess having a tapered mouth, a nut threaded on the recessed end of said coupling, and a composite clamping member interposed between said nut and the recessed end of said body member, said clamping member comprising, a sleeve having a deformable end and recessed at its opposite end, and a packing ring compressed within said sleeve by said nut to create a seal and cushion between the sleeve and tube, said cushion serving to absorb vibration imparted to the tube.

5. A tube coupling comprising, a body member recessed at one end for receiving the end of a tube, said recess having a tapered mouth, a nut threaded on the recessed end of said coupling, and a composite clamping member interposed between said nut and the recessed end of said body member, said clamping member consisting of a sleeve having a deformable end contracted on the tube within said flared mouth and an internal annular recess formed in its non-deformable opposite end, and a ductile packing ring longitudinally compressed within said sleeve by said nut to radially expand said ring to create a seal and cushion between the sleeve and tube, said cushion serving to absorb vibration imparted to the tube, said sleeve serving as a positive stop to limit travel of said nut on said body member and also the extent of deformation of the deformable end of said sleeve.

6. A tube coupling comprising, a body member recessed at one end for receiving the end of a tube, said recess having a tapered mouth and an inner restricted bore forming a stop to normally limit insertion of the tube into said recess, a nut threaded on the end of said coupling and provided at one end with an inner annular flange, and a composite clamping member interposed between said nut and the recessed end of said body member, said clamping member consisting of a sleeve having a deformable end contracted on the tube within said flared mouth and an internal annular recess formed in its opposite non-deformable end, the recess end of said sleeve surrounding said annular flange and abutting the end of said nut, an external shoulder formed on said sleeve adjacent its deformable end and abutting the recessed end of said body member to limit travel of said nut on said body member, and also the extent of deformation of the deformable end of said sleeve and a packing ring compressed within the recess of said sleeve by said annular flange to radially expand said ring to create a seal and cushion between the sleeve and tube, said cushion serving to absorb vibration imparted to the tube.

7. In a tube coupling of the character described, a composite clamping member comprising, a sleeve having a deformable end and recessed at its opposite end within a non-deformable portion of the sleeve, and a longitudinally compressible ductile packing ring fitted within said recess.

8. A tube coupling comprising a body member recessed at one end for receiving the end of a tube in a pressed fit, said recess terminating in a flared mouth extending outwardly from its pressed fit portion, a nut threaded on the recessed end of said coupling, and a composite clamping member interposed between said nut and the recessed end of said body member, said clamping member consisting of a sleeve having a deformable end contracted on the tube within said flare and mouth and an internal annular recess formed in its non-deformable opposite end, and a packing ring longitudinally compressed within said recess by said nut to radially expand said ring to provide a seal and create a cushion between the sleeve and tube to absorb pulsating vibrations imparted to the tube.

DON F. STRANBERG.

REFERENCES CITED

The following references are of record in the file of this patent:

UNITED STATES PATENTS

| Number | Name | Date |
| --- | --- | --- |
| 1,581,538 | Hill | Apr. 20, 1926 |
| 1,934,241 | Seward | Nov. 7, 1933 |
| 2,080,271 | Hirst | May 11, 1937 |
| 2,171,217 | Kreidel | Aug. 29, 1939 |

FOREIGN PATENTS

| Number | Country | Date |
| --- | --- | --- |
| 352,268 | Germany | Apr. 24, 1922 |